Dec. 15, 1931.  D. L. ROULEAU  1,836,817
POTTERY TOPPING MACHINE
Filed July 29, 1929  2 Sheets-Sheet 1

INVENTOR
David L. Rouleau

BY
Whittemore, Hulbert, Whittemore & Belknap
ATTORNEYS

Dec. 15, 1931.  D. L. ROULEAU  1,836,817
POTTERY TOPPING MACHINE
Filed July 29, 1929   2 Sheets-Sheet 2
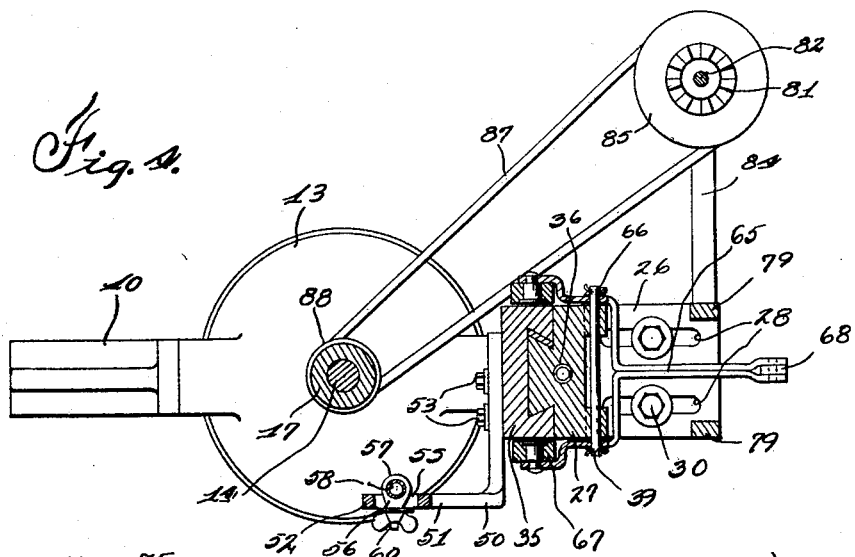
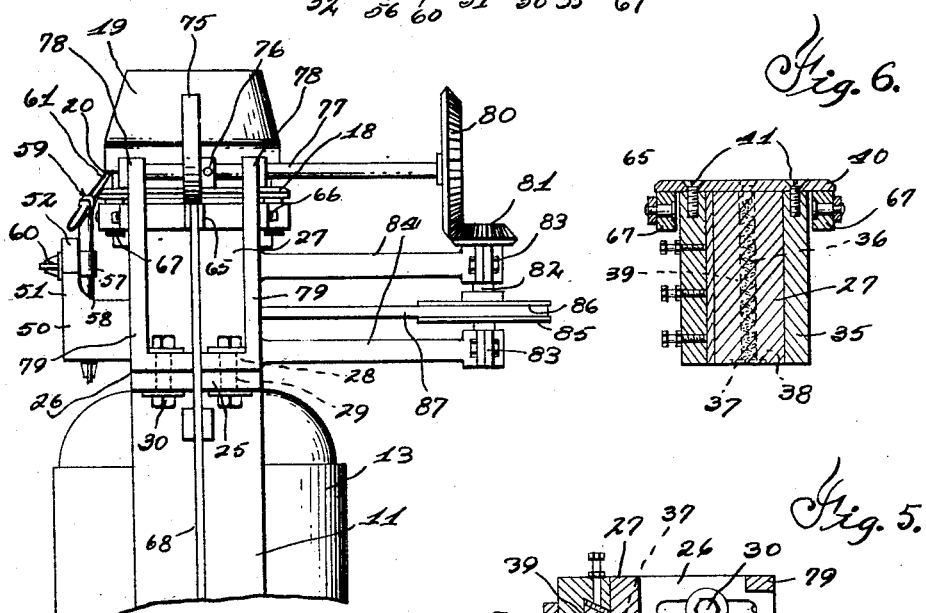
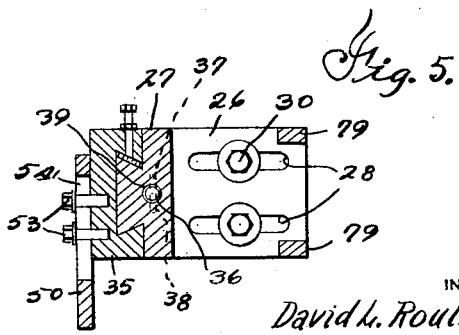
INVENTOR
David L. Rouleau Patented Dec. 15, 1931

1,836,817

UNITED STATES PATENT OFFICE

DAVID L. ROULEAU, OF MOUNT CLEMENS, MICHIGAN

POTTERY TOPPING MACHINE

Application filed July 29, 1929. Serial No. 381,770.

This invention relates to machinery for use in the manufacture of pottery and has particular reference to a machine for topping pottery prior to the firing of the same in a kiln.

This invention has among its objects the provision of a machine which may be readily adjusted to top articles of pottery of different sizes; the provision of a machine of the character described in which the working parts will be thoroughly shielded from the dust and the like incident to the step of topping pottery, and the provision of a machine of the above mentioned character in which the cutting action of the topping tool may be automatically controlled.

Other objects and advantages of the invention together with the numerous novel details of construction will become more apparent as the following description proceeds, particularly when reference is had to the accompanying drawings, wherein Figure 1 is a front elevational view of a machine constructed in accordance with the teachings of this invention;

Figure 2 is a fragmentary end elevational view of the structure shown in Figure 1;

Figure 4 is a horizontal sectional view taken substantially on the line 4—4 of Figure 3;

Figure 5 is a horizontal sectional view taken substantially on the line 5—5 of Figure 3, and Figure 6 is a vertical sectional view taken substantially on the line 6—6 of Figure 3.

Figure 1:
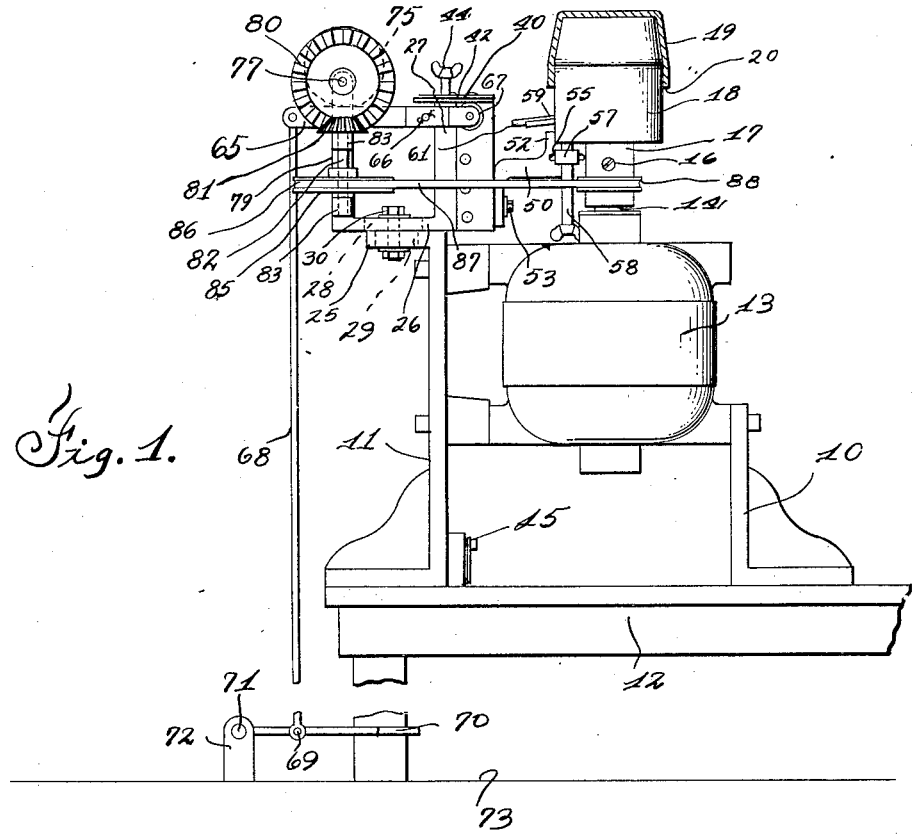
Figure 3:
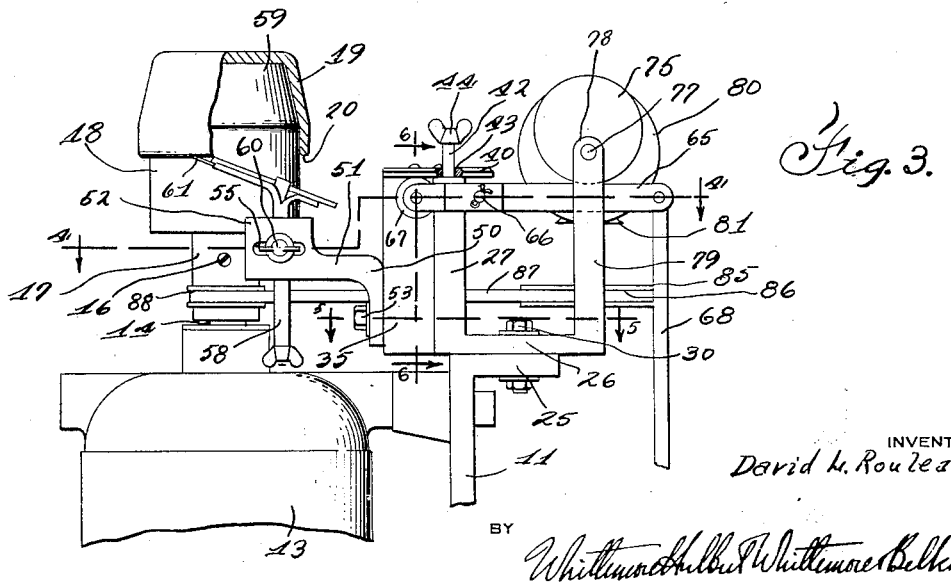
Figure 3 is a fragmentary rear elevational view of the machine shown in Figure 1.

In the drawings the machine is shown as including a frame formed of the side frame members 10 and 11 bolted or otherwise fixed to a suitable support 12 which may, as illustrated, be the top of a bench. Supported by the frame members is a variable speed motor 13 provided with the driven shaft 14. While the motor may be of any desired character, it may as illustrated be an electric motor, the speed of which is controlled by a suitable rheostat 15.

As illustrated the motor is supported with its shaft 14 in a vertical position and detachably fixed to the projecting upper end of this shaft, as by the set-screws 16, is the sleeve 17 of a chuck 18. The chuck is made of suitable form to receive the particular type of pottery which is to be finished but in general is provided with a conical surface to frictionally engage the inner periphery of an article of pottery such as a cup 19. The cup is provided with the annular rounded edge 20 adapted during rotation of the cup by the chuck to be engaged and shaped by a suitable tool in a manner hereinafter to be more fully described.

The frame member 11 is extended above the frame member 10 and is provided at its upper end with the laterally extending flange 25 forming a support for the base 26 of a dovetail guideway 27. The base 26 is provided with the elongated slots 28 which register with similar slots 29 formed in the flange 25 and bolts 30 project through the slots 28 and 29 respectively for clamping the base 26 to the flange 25. Thus by loosening the bolts 30 the guideway 27 may be moved toward or away from the axis of the chuck 18.

Mounted on the guideway 27 for vertical sliding movement thereon is a member 35. This member is normally held in its lower or depressed position by a spring 36 fixed at its lower end to a pin 37 seated in a groove 38 formed in the lower face of the guideway 27. The spring extends through a bore 39 in the guideway and is connected at its other end to a plate 40 fixed as by the screws 41 to the upper end of the member 35. A bolt 42 anchored in the guideway 27 projects from the upper end of this guideway and through an opening 43 in the cover 40 and is provided on its free end with a wing-nut 44 which forms an adjustable stop engageable with the upper face of the cover plate 40 to limit upward movement of the member 35. Thus the member 35 is mounted for vertical movement between the limits defined by contact of the plate 40 with the top of the guideway 27 and the under face of the stop 44.

Carried by the forward face of the member 35 and mounted for adjustment transversely thereof is a bracket 50 provided with the angularly bent arm 51 which terminates in a head 52 to one side of the axis of the chuck 18. The bracket 50 is preferably fixed to the member 35 by bolts 53 which project through slots 54 formed in the bracket and threadedly engage the member 35. Thus the bracket 50 may be adjusted transversely of the member 35 to move the head 52 laterally toward or away from the axis of the chuck 18.

The head 52 is provided with a horizontally arranged slot 55 through which a stem 56 of a yoke 57 extends. The tubular body portion 58 of a tool holder designated generally by the reference character 59 is mounted for vertical sliding movement in the yoke 57 and is adapted to be clamped in adjusted position by a nut 60 threaded on the outer end of the stem 56. The tool holder 59 is preferably of the type disclosed in my copending application Serial No. 351,766 filed April 1, 1929, and is adapted to support a tool 61 with its axis arranged at an inclination to the plane of rotation of the edge 20 of the article of pottery.

For raising the member 35 to bring the cutting end of the tool 61 into engagement with the edge of the article of pottery, there is provided a lever 65 pivotally mounted as at 66 on the rear face of the guideway 27. At its one end the lever 65 is bifurcated and is provided with the rollers 67 adapted to engage the under side of the cover 40 which is extended beyond the sides of the member 35 for this purpose. At its opposite end the lever 65 is connected to a link 68 which in turn is connected as at 69 to a foot pedal 70 pivoted as at 71 to a support 72 mounted on the floor 73 below the bench 12. Obviously the pedal 70 may be depressed to rock the lever 65 about its pivot and thus raise the member 35 against the tension of the spring 36.

For automatically raising the member 35 upon rotation of the chuck 18 there may be provided a cam 75 fixed as by set-screw 76 to a shaft 77 rotatably journaled in bearings 78, formed in suitable supports 79 carried by the base 26. The shaft 77 is provided on its one end with a bevel gear 80 which meshes with a bevel gear 81 fixed to a vertical shaft 82 rotatably mounted in bearings 83 formed in supporting plates 84 which project laterally from one of the supporting members 79. Fixed to the shaft 82 is a pulley 85 provided with a V-groove 86 adapted to receive a V-belt 87 which extends around the sleeve 17 of the chuck and engages a V-groove 88 in this sleeve. The arrangement is such that the cam 75 will be slowly rotated upon rotation of the chuck 18 to thus cause the high portion of the cam to slowly depress the lever 65 and thus slowly feed the tool 61 axially of the chuck 18 to bring its cutting edge into engagement with the edge of the article of pottery.

From the above it is believed that the structure and operation of the machine will be clearly apparent. The tool holder may be adjusted toward and away from the axis of the chuck 18 to thus adapt the machine to edge articles of pottery of different sizes. This adjustment of the tool is effected by an adjustment of the bracket 50 transversely of the member 35. The chuck being detachably connected to the shaft of the motor may be replaced by a larger or smaller chuck to fit the desired size article of pottery as will be readily apparent.

As the tool is adjusted away from the axis of the chuck to thus cut on a larger diameter, the speed of rotation at the point of application of the tool will naturally be increased if the speed of the shaft 14 is kept constant. The invention therefore provides the variable speed motor for regulating the speed of rotation of the chuck 18 and to thus maintain a constant speed at the point of application of the cutting tool irrespective of the diameter on which the tool cuts. Thus as the diameter of cut is increased the speed of rotation of the chuck will be decreased, while as the diameter of cut is decreased the speed of rotation of the chuck it will be correspondingly increased.

In operation the article of pottery will be placed on the chuck 18 on which it will be held by frictional engagement. The chuck will then be rotated and the member 35 will be moved vertically upwardly by the lever 66 to bring the tool into cutting engagement with the edge of the article of pottery. The stop 44 will limit vertical movement of the member 35 to thus control the depth of the cut of the tool.

The lever 66 may be actuated by the foot pedal 70 but is preferably automatically actuated by the cam 75 which is driven from the chuck 18 by the belt 87. The ratio of the connections is such that the shaft 77 will be slowly rotated so that the cam 75 will function to gradually bring the tool into engagement with the edge of the article of pottery.

With the motor arranged vertically as illustrated, the parts thereof may be thoroughly shielded from the dust incident to the cutting operation of the tool, while the cover 40 on the member 35 will function to protect the bearing surface of the guideway from this dust. Thus the working parts of the machine may be fully enclosed to protect these parts during the operation of the machine.

What I claim as my invention is:

1. In a pottery topping machine, a rotatable chuck for supporting an article of pottery, a tool adjustable toward and away from the axis of said chuck and engageable with said article of pottery and a variable speed motor for rotating said chuck, whereby the speed of rotation of the article of pottery at the point of engagement of the tool may be regulated.

2. In a pottery topping machine, a rotatable chuck for supporting an article of pottery, means for rotating said chuck, a tool engageable with the periphery of said article of pottery and means for varying the speed of rotation of said chuck to control the peripheral speed of rotation of said article of pottery.

3. In a pottery topping machine, a frame, a rotatable chuck carried thereby for holding an article of pottery having an annular edge, and a tool holder movable to engage a tool with the edge of said article of pottery, said tool holder being adjustable toward and away from the axis of said chuck to adapt the same to the diameter of the article of pottery.

4. In a pottery topping machine, a rotatable chuck adapted to hold an article of pottery having an annular edge, a tool holder, a tool carried by said tool holder, and means for adjusting the said tool holder relative to the axis of said chuck to align said tool with the said edge of the article of pottery irrespective of the diameter thereof.

5. In a pottery topping machine, a rotatable chuck adapted to hold an article of pottery having an annular edge, a tool holder movable toward and away from the axis of said chuck to engage a tool with the edge of said article of pottery, and a variable speed motor for rotating said chuck, whereby the speed of rotation of the edge of said article of pottery may be controlled.

6. In a pottery topping machine, a rotatable chuck adapted to hold an article of pottery having an annular edge, a tool holder, a tool carried by said tool holder, means for adjusting said tool holder relative to the axis of said chuck to align said tool with the edge of the article of pottery irrespective of the diameter thereof, means for moving said tool into engagement with the edge of the article of pottery, and a variable speed motor for rotating said chuck whereby the speed of rotation at the point of engagement of said tool with said edge may be controlled.

7. In a pottery topping machine, a rotatable chuck adapted to hold an article of pottery having an annular edge of rounded cross section, a tool of rounded cross sectional shape movable relative to said chuck for engagement with the edge of said article, and means for rotating said chuck and for moving said tool.

8. In a pottery topping machine, a rotatable chuck adapted to hold an article of pottery, a tool movable relative to said chuck for engagement with the edge of said article, means for rotating said chuck, and means operable upon rotation of said chuck to move said tool to engage said edge.

9. In a pottery topping machine, a rotatable chuck adapted to hold an article of pottery, a tool holder movable axially of said chuck and having a tool engageable with the edge of said article, means for rotating said chuck, and means operable upon rotation of said chuck to actuate said tool holder.

10. In a pottery topping machine, a rotatable chuck adapted to hold an article of pottery, a tool holder movable axially of said chuck and having a tool engageable with the edge of said article, and a cam for moving said tool holder.

11. In a pottery topping machine, a rotatable chuck adapted to hold an article of pottery, a tool adapted for engagement with the edge of said article, a lever for moving said tool axially of said chuck, and a cam for actuating said lever.

12. In a pottery topping machine, a rotatable chuck adapted to hold an article of pottery, a tool, a lever for moving said tool axially of said chuck to engage the same with the edge of the article, a cam for actuating said lever, means for rotating said chuck, and means for driving said cam from said rotatable chuck.

13. In a pottery topping machine, a frame including an upright, a rotatable chuck for supporting an article of pottery carried by said frame, a guideway mounted on said upright for adjustment toward and away from the axis of said chuck, a member carried by said guideway, and a tool holder fixed to said member for adjustment transversely of the axis of said chuck.

14. In a pottery topping machine, a frame including an upright, a rotatable chuck for supporting an article of pottery carried by said frame, an angle plate having one leg thereof adjustably mounted to the top of said upright for movement toward and away from the axis of said chuck, a member mounted for vertical reciprocation on the other leg of said angle plate, and a tool holder for supporting a tool in engagement with the edge of said article of pottery, said tool holder being adjustably mounted on said member for movement in a direction transversely of the axis of said chuck.

15. In a pottery topping machine, a frame, a rotatable chuck carried thereby and adapted to hold an article of pottery, a tool engageable with the edge of said article of pottery for shaping the same, and means mounting said tool for adjustment transversely of and axially of the axis of said chuck.

16. A machine for topping pottery including in combination a frame, a rotatable chuck carried thereby and adapted to hold an article of pottery, a tool movable axially of said chuck into and out of engagement with the edge of the article of pottery, and means including a cam for moving said tool into engagement with the edge of the article of pottery.

17. A machine for topping pottery including in combination a frame, a rotatable chuck carried thereby and adapted to hold an article of pottery, a guideway carried by said frame, a tool holder slidably mounted on said guideway and having a tool engageable with the edge of said article of pottery, means for rotating said chuck, and means operable upon rotation of said chuck to move said tool into engagement with the edge of the article of pottery.

In testimony whereof I affix my signature.

DAVID L. ROULEAU.